US009050241B2

(12) United States Patent
Tsai et al.

(10) Patent No.: US 9,050,241 B2
(45) Date of Patent: Jun. 9, 2015

(54) MEDICINE CONTAINER AND MEDICATION AUXILIARY DEVICE

(71) Applicant: NATIONAL CHENG KUNG UNIVERSITY, Tainan (TW)

(72) Inventors: Pei-Hsuan Tsai, Taipei (TW); Yi-Zong Ou, Zhongli (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 13/965,707

(22) Filed: Aug. 13, 2013

(65) Prior Publication Data

US 2014/0042052 A1 Feb. 13, 2014

(30) Foreign Application Priority Data

Aug. 13, 2012 (TW) ............................. 101129238 A

(51) Int. Cl.

| | |
|---|---|
| ***G06K 19/00*** | (2006.01) |
| ***A61J 1/03*** | (2006.01) |
| ***A61J 1/16*** | (2006.01) |
| ***A61J 7/00*** | (2006.01) |
| ***A61J 7/04*** | (2006.01) |

(52) U.S. Cl.

CPC .... *A61J 1/03* (2013.01); *A61J 1/16* (2013.01); *A61J 7/0084* (2013.01); *A61J 7/0409* (2013.01); *A61J 2007/0418* (2013.01); *A61J 2205/10* (2013.01)

(58) Field of Classification Search

USPC .................................. 235/435, 439, 454, 462

See application file for complete search history.

(56) References Cited

U.S. PATENT DOCUMENTS

2011/0303746 A1* 12/2011 Learmonth et al. ........... 235/380
2011/0308973 A1* 12/2011 Patenaude .................... 206/63.5

FOREIGN PATENT DOCUMENTS

TW 574662 B 2/2004
TW 201130479 A 9/2011

* cited by examiner

*Primary Examiner* — Matthew Mikels
(74) *Attorney, Agent, or Firm* — Muncy, Geissler, Olds & Lowe, P.C.

(57) ABSTRACT

A medicine container detachably disposed in an electronic medicine box includes an accommodating portion and a cover portion. The accommodating portion has a medicine containing space. The cover portion is movably connected to accommodating portion and has a barcode. When the medicine container is disposed in the electronic medicine box, the barcode is readable. A medication auxiliary device including a plurality of the above medicine containers and an electronic medicine box is also disclosed.

9 Claims, 7 Drawing Sheets

MEDICINE CONTAINER AND MEDICATION AUXILIARY DEVICE

CROSS REFERENCE TO RELATED APPLICATIONS

This Non-provisional application claims priority under 35 U.S.C. §119(a) on Patent Application No(s). 101129238 filed in Taiwan, Republic of China on Aug. 13, 2012, the entire contents of which are hereby incorporated by reference.

BACKGROUND OF THE INVENTION

1. Field of Invention

The invention relates to a medicine container and, in particular, to a medicine container applied with an electronic medicine box.

2. Related Art

The advancement of technology improves the people's life and diet, but makes the modern human beings be much troubled by the diseases of civilization, such as chronic diseases including the hypertension, cancer, cardiovascular disease, diabetes or the like; or mental illnesses including the depressive illness, bipolar disorder or the like. The treatments for these diseases need to rely on the long-term medicine treatment. Although the technology is getting more and more advanced than the prior art and the digitized era has come, the conditions of prescription drug misuse still come out one after the other.

In the current hospital administration condition, after the patient goes to the hospital or clinic for the consultation, the patient receives several days of medicines, which are usually placed in a medicine bag, and the hospital or clinic staff records the medication information, such as the time interval and the number of the medications, on the medicine bag. The patient has to take the medicines from the medicine bag according to the doctor's advice. Of course, the busy office workers or elderly persons tend to forget to take the medicine, or forget which medicines should be taken. In view of this, some manufacturers have produced medicine boxes to assist in solving the above-mentioned problem and make the patient dispense the medicines according to the dosage for each day and each time when the patient still remembers the information. Then, the patient only has to take the medicines in order. However, the above-mentioned method still needs the patient to remember the information. In the condition where the medicine types are diversified and the dosages may vary in every medication, this procedure provides the extremely high risk of medication error for the elderly persons or the critically ill patients.

The typical medicine box only provides the function for the user to place the medicines. Even if some medicine boxes allow the user to mark an easy record on the container to record the common period to take medicines, such as before or after breakfast, lunch and dinner, there are considerable risks to cause the prescription drug misuse. For example, since the medicines are dispensed by the non-expert, either the family member, the caregiver or the patient himself or herself, at home, the patient may take wrong medicines. More particularly, upon medication, the patient cannot obtain the reference information to clearly know whether the medication is correct or not. Thus, it is further difficult to decrease the risk of medication error. Generally speaking, the most frequently seen medication error at present includes taking the incorrect medicine, taking the medicine at the incorrect time, forgetting to take which kind of medicine, or the like, and the current industry does not provide the better solution.

Therefore, it is an important subject to provide a medicine container, which can decrease the opportunity of dispensing the medicines by non-experts, can assist in solving the medicine taking problem, can precisely record the medication reference information, can remind the patient to take the medicine or remind the doctor's advice of the patient at the suitable time, and can solve the problem of the high medication error at present.

SUMMARY OF THE INVENTION

To achieve the above subject, an objective of the invention is to provide a medicine container having a barcode, which precisely records the medication reference information, such as the medicine taking information, the medicine information or the like, so as to solve the conventional problems that the reference information cannot be obtained upon medication and whether the medication is correct or not cannot be clearly obtained. Thus, the risk of the medication error can be further reduced.

Another objective of the invention is to provide a medication auxiliary device, which can read the medication information recorded on the barcode, and have a reminding module for reminding the patient to take the medicine at the suitable time or reminding the patient of the doctor's advice, so as to decrease the condition of taking the medicine at the incorrect time, or forgetting to take the medicine or medication errors, and the like.

To achieve the above objectives, the present invention discloses a medicine container detachably disposed in an electronic medicine box and including an accommodating portion and a cover portion. The accommodating portion has a medicine containing space. The cover portion is movably connected to accommodating portion and has a barcode. When the medicine container is disposed in the electronic medicine box, the barcode is readable.

In one embodiment of the invention, the barcode is disposed on an outer side of the cover portion opposite to the medicine containing space.

In one embodiment of the invention, the cover portion has a metal member or a magnetic member.

In one embodiment of the invention, the barcode records medicine taking information, medicine information or personal identification information.

To achieve the above objectives, the present invention also discloses a medication auxiliary device including a plurality of medicine containers and an electronic medicine box. Each of the medicine containers includes an accommodating portion and a cover portion. The accommodating portion has a medicine containing space. The cover portion is movably connected to the accommodating portion and has a barcode. The medicine containers are detachably disposed in the electronic medicine box. The electronic medicine box includes a reminding module. When the medicine containers are disposed in the electronic medicine box, the barcodes are readable, and the reminding module reminds according to reminder data, generated after the barcodes are read.

In one embodiment of the invention, the electronic medicine box comprises a base having a plurality of housing units, and the medicine containers are detachably disposed in the housing units, respectively.

In one embodiment of the invention, each of the housing units has a warning component.

In one embodiment of the invention, the electronic medicine box comprises a plurality of upper cover portions movably connected to the housing units, respectively.

In one embodiment of the invention, each of the upper cover portions has an opening, and when the medicine containers are disposed in the housing units of the electronic medicine box, the barcodes are exposed through the openings and become readable.

In one embodiment of the invention, each of the housing units has a cover sensing unit, which senses opening and closing of the upper cover portions.

In one embodiment of the invention, each of the cover portions has a metal member or a magnetic member, each of the upper cover portions has a magnetic piece, and the magnetic piece magnetically attracts the metal member or the magnetic member.

In one embodiment of the invention, each of the housing units has a container detection unit.

In one embodiment of the invention, the electronic medicine box further comprises a control module, which controls the upper cover portions to open and close according to control data generated after the barcodes are read.

In one embodiment of the invention, the electronic medicine box further comprises a processing module, and the processing module receives and processes image data read from at least one of the barcodes.

In one embodiment of the invention, the electronic medicine box further comprises a photographing module, which outputs the image data to the processing module.

As mentioned above, the medicine container and the medication auxiliary device thereof according to the invention have the following features. The medicine container has the barcode, which can carry the information, such as the medicine taking information, the medicine information, the personal identification or the like. When being used in conjunction with the electronic medicine box, the information recorded on the barcode can be read through the electronic medicine box, so that the patient can precisely know the medicine taking information and the medicine information, for example, and the condition of medication error can be avoided by again checking the personal identification information. Most important of all, the medicine container is configured to load the medicines and record the barcode under the monitor of the expert (e.g., the expert in the hospital or pharmaceutical factory), and the commonly used electronic medicine box can assist the patient medication directly according to the recorded content of the barcode. More particularly, the opportunity of making the non-expert involve in the medicine dispensing can be reduced or even avoided, thereby effectively reducing the risk of error medication.

In addition, according to the property of the medicine container, which can be opened and closed and carry the associated information, the commonly used electronic medicine box can further have the reminding module and the warning component to actively and properly give the remind and check according to the medication schedule, so as to avoid the conditions caused by the medication time error, or forgetting to take the medicine, or the incorrect medication kind. Compared with the prior art, the invention provides a medicine container and its medication auxiliary device capable of improving the conventional problem, such as that the conventional medicine box cannot record the medicine taking information and the medicine information in detail, that the non-expert may involve in dispensing the medicines, that the reminding function setting processes are too complicated, and that the use is too inconvenient to cause the medication error indirectly.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
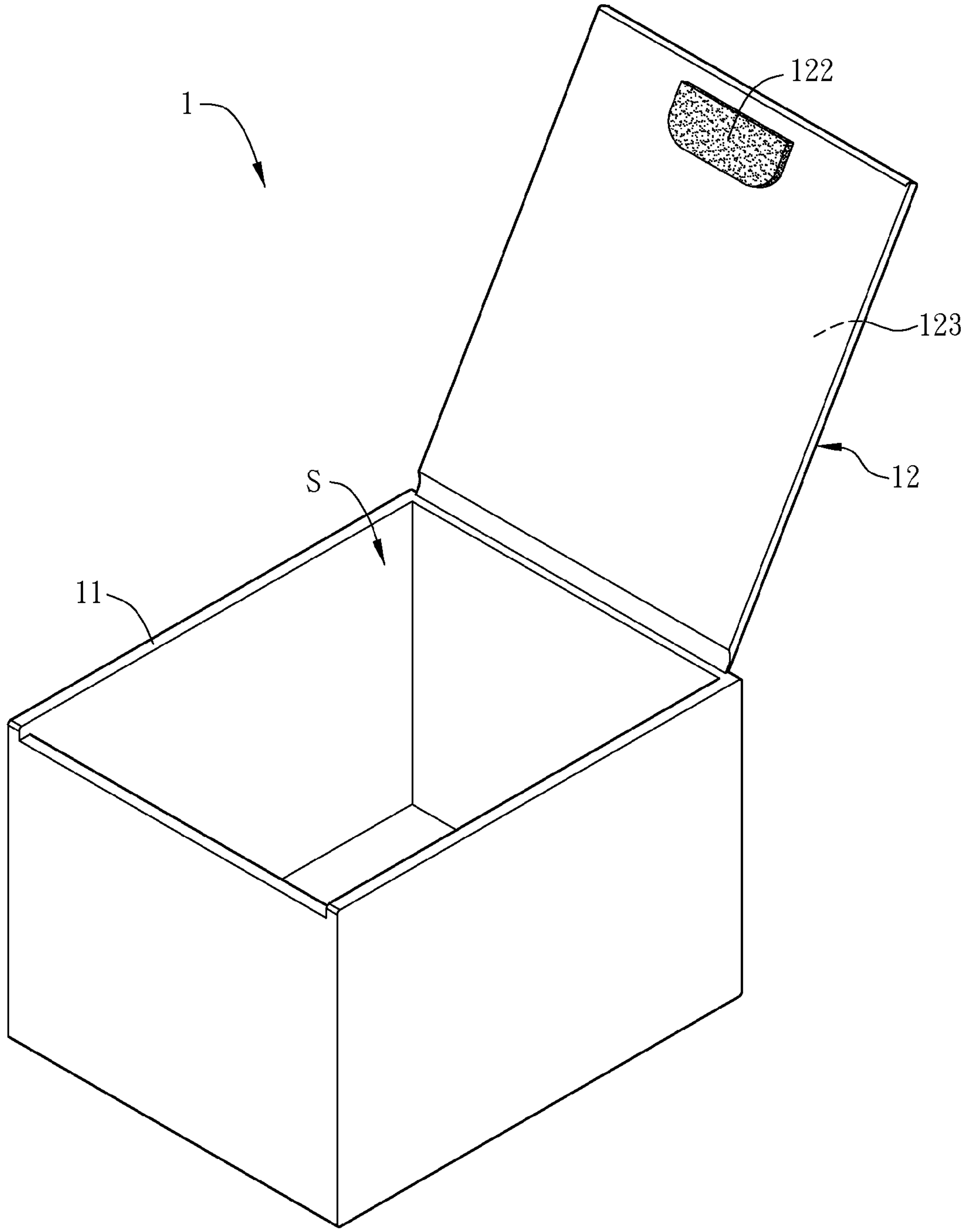
FIG. 1 is a schematic illustration showing a medicine container according to a preferred embodiment of the invention.
Figure 2:
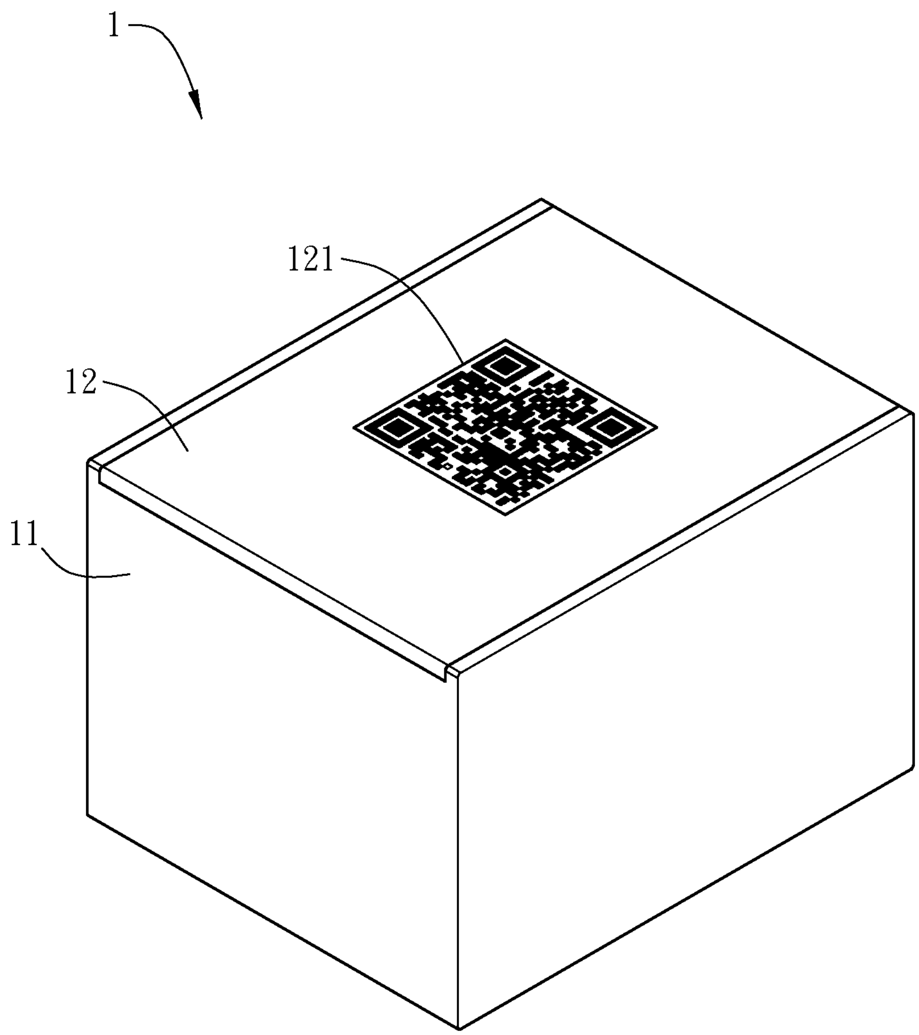
FIG. 2 is a schematic illustration showing the closed cover portion of the medicine container of FIG. 1.

FIG. 1 is a schematic illustration showing a medicine container 1 according to a preferred embodiment of the invention, wherein a cover portion of the medicine container is in an open state, and FIG. 2 is a schematic illustration showing the closed cover portion of the medicine container of FIG. 1. Referring to FIGS. 1 and 2, a medicine container 1 includes an accommodating portion 11 and a cover portion 12. The accommodating portion 11 has a medicine containing space S. The cover portion 12 is movably connected to the accommodating portion 11, and the cover portion 12 has a barcode 121. When the medicine container 1 is disposed in an electronic medicine box, the barcode 121 is readable. In this embodiment, the accommodating portion 11 and the cover portion 12 are integrally formed jointly with each other. In practice, however, the invention is not restricted thereto, and the portions 11 and 12 may be separate members.

The medicine container 1 may be a plastic box like container made of a plastic material by way of injection molding. However, the use of this design is to decrease the manufacturing cost and facilitate the portable property and preservation. For the practical application, of course, other materials or shapes (e.g., a soft pouch) may be adopted, and various medicine boxes with various models or materials known in the market may be adopted under the technological characteristics of the invention. In addition, the invention does not intend to restrict the connection form between the cover portion 12 and the accommodating portion 11 as long as the cover portion 12 and the accommodating portion 11 can be movably opened and closed with respect to each other for the sake of medicine preservation and access. Specifically speaking, the cover portion 12 and the accommodating portion 11 may be pivotally connected together through a pivoting structure, may be slidably connected together to act as a sliding cover, or may be connected together through a thinned plastic material, as shown in the drawing. In addition, the cover portion of the medicine container 1 according to the preferred embodiment of the invention further has a connector 122, which is a metal member or a magnetic member. When the medicine container 1 is disposed in the electronic medicine box, the electronic medicine box can magnetically attract the corresponding connector 122 through a magnetic piece of the upper cover portion, so that the cover portion 12 and the upper cover portion may be opened and closed in a linking-up manner (see FIG. 4). The detailed operations will be described in the following.

The barcode 121 is disposed on an outer side of the cover portion 12 opposite to the medicine containing space S. As shown in the drawing, the barcode 121 is disposed on an outer surface 123 of the cover portion 12 so that it can be read advantageously. The barcode 121 may record the arbitrary information associated with the medicines, such as the medicine taking information, the medicine information or the personal identification information. The medicine taking information may contain the information, such as the medication time, the medication frequency, the dosage, the taking way, the precaution or the like. The medicine information may include the information, such as the medicine exterior model, the medicine name, the preservation way, the side effect or the like. The personal identification information includes the information, such as the name and surname, the medical record number code, the medicine allergy or back to clinic arrangement. It is to be noted, however, that the information listed hereinabove is for the illustrative but non-restrictive purpose.

In practice, a medicine may be placed in each medicine container 1, and the information, which is associated with the medicine and includes the medicine taking information, the medicine information, the personal identification information and the like, for example, is converted into the barcode 121 by a barcode encoder and then directly printed on the outer surface 123 of the cover portion 12.

There are two application occasions. In the first occasion, when the medicine has the wide applicability, the invention may be directly used to package the medicine when the pharmaceutical factory is manufacturing the medicine, and the associated information can be directly recorded on the medicine container 1 through the barcode 121. Alternatively, the health care workers can package different medicines into different medicine containers 1 according to the doctor's advice after the patient has seen the doctor. Meanwhile, the associated information is directly recorded on the medicine container 1 through the barcode 121, thereby eliminating the medicine memo, which has to be written or outputted in each administration. Not only the labor of the health care worker can be saved, but the information may also be digitized so that the information can be provided to the medicine taker in the more suitable manner. Meanwhile, what is more important is that no non-expert has involved into the processes of placing the medicine into the medicine container 1, printing the barcode 121 and reading the barcode 121, and the process of dispensing the medicines by the patient, for example, can be avoided because this dispensing process by the patient may cause the dispensing error and thus the medication error.

In addition, the medical institution may also utilize the barcode encoder to convert the personal identification information into a portion of the recorded content of the barcode 121 in a similar manner, so that the patient can further identify whether the identification passes by reading the data of the barcode 121 after obtaining the medicine container 1, thereby avoiding the condition of the administration error.

It is to be specified that, in addition to the direct printing, the barcode 121 may also be printed on a sticker, which is then adhered. However, the invention is not particularly restricted thereto.

Figure 3:
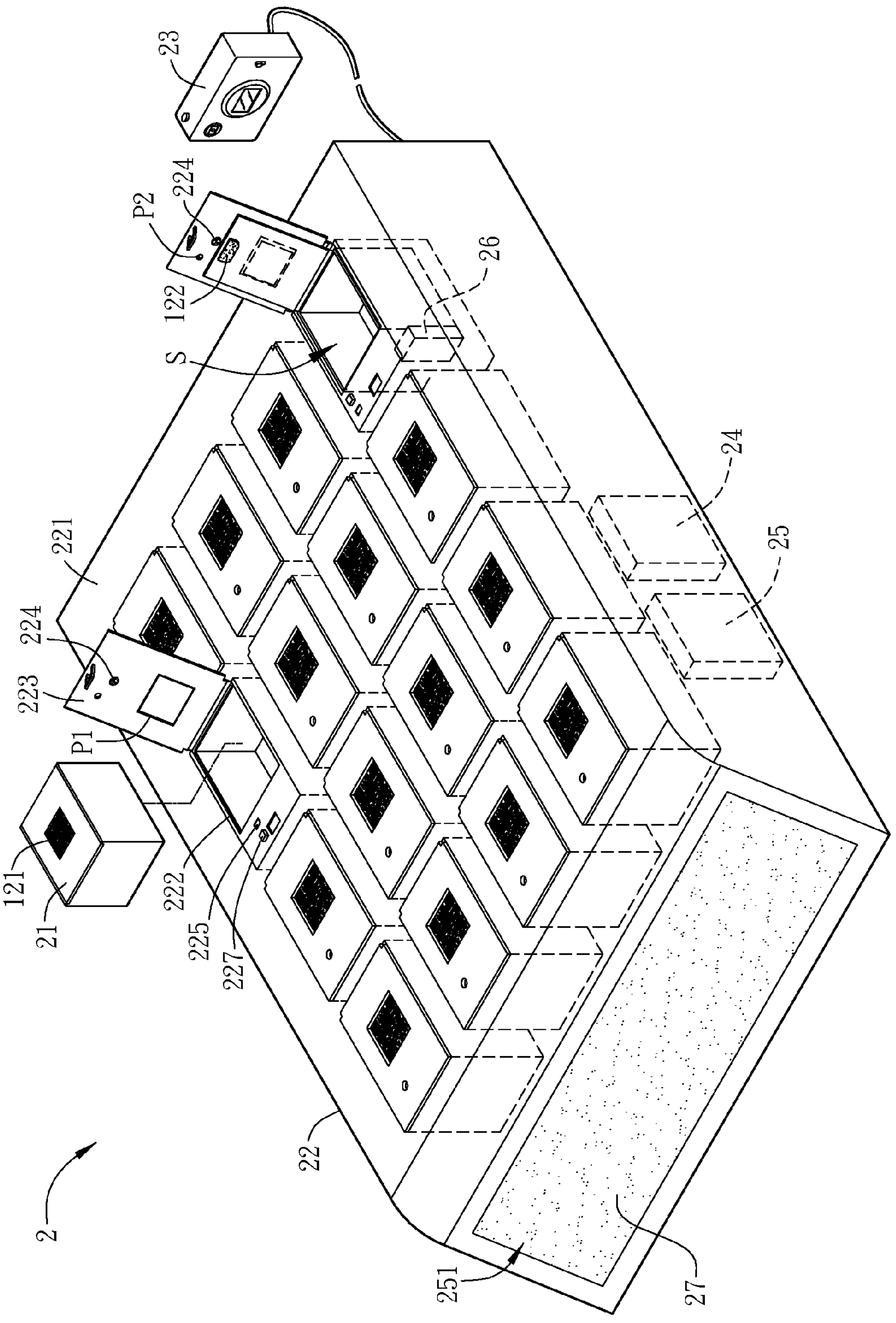
FIG. 3 is a schematic illustration showing a medicine container according to the preferred embodiment of the invention used in conjunction with an electronic medicine box.

FIG. 3 is a schematic illustration showing a medicine container 21 according to the preferred embodiment of the invention used in conjunction with an electronic medicine box 22. As shown in FIG. 3, a medicine container 21 has the same or similar elements and structures as the medicine container 1 of the above-mentioned embodiment and details can be found hereinabove, so detailed descriptions thereof will be omitted. The combination of the medicine container 21 and an electronic medicine box 22 may be regarded as a medication auxiliary device 2 for assisting, reminding or identifying the correctness of the patient medication.

In this embodiment, the medication auxiliary device 2 includes a plurality of medicine containers 21 and an electronic medicine box 22. However, the number does not intend to restrict to the invention. In other embodiments, one, two, three or more than three medicine containers 21 may be used. Each medicine container 21 is detachably disposed in the electronic medicine box 22, so that the patient or user can easily place the medicine container 21 from the medical institution or the pharmaceutical factory into the electronic medicine box 22.

Figure 4:
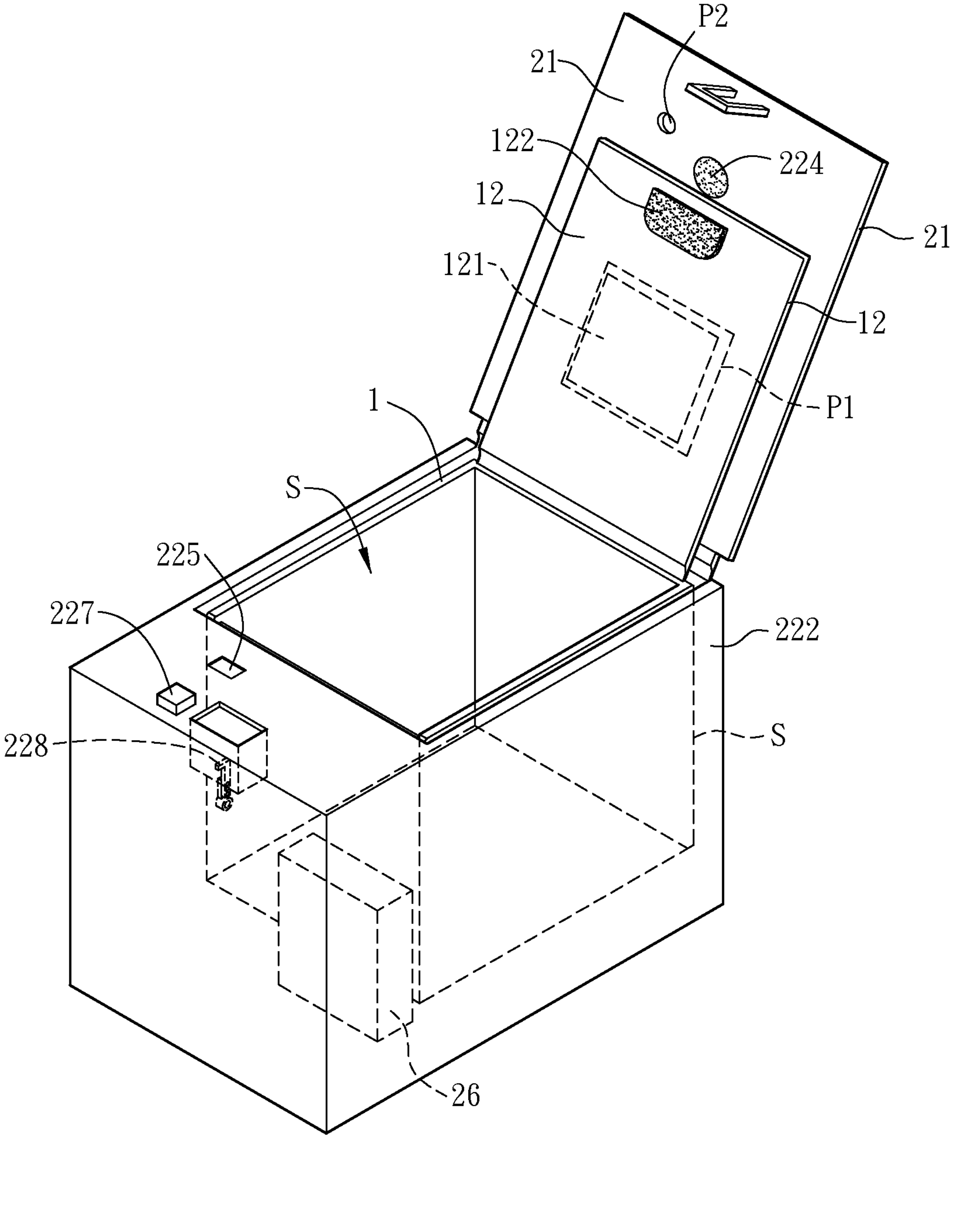
FIG. 4 is a schematic enlarged view showing a housing unit of the electronic medicine box of FIG. 3 combined with the medicine container.

The electronic medicine box 22 includes a base 221 having a plurality of housing units 222. FIG. 4 is a schematic enlarged view showing a housing unit 222 of the electronic medicine box 22 of FIG. 3 combined with the medicine container. Referring to FIGS. 3 and 4, each housing unit 222 provides a containing space S so that the medicine containers 21 are detachably disposed in the housing units 222, respectively. The electronic medicine box 22 further includes a plurality of upper cover portions 223 movably connected to the housing units 222, respectively. When the medicine container 21 is disposed in the housing unit 222, the connector of the cover portion thereof is magnetically attracted by a magnetic piece 224 of the upper cover portion 223 and is driven in a linking-up manner. The connection form between the upper cover portion 223 and the housing unit 222 may be similar to or the same as that between the accommodating portion 11 and the cover portion 12 in the above-mentioned embodiment, so detailed descriptions thereof will be omitted. However, in order to lengthen the endurability and facilitate the automatic opening and closing, the upper cover portion 223 is preferably connected to the housing unit 222 through a pivot mechanism, and a driving component (not shown) may be provided and connected to the pivot mechanism so as to automatically control the opening and closing of the upper cover portion 223.

Figure 5:
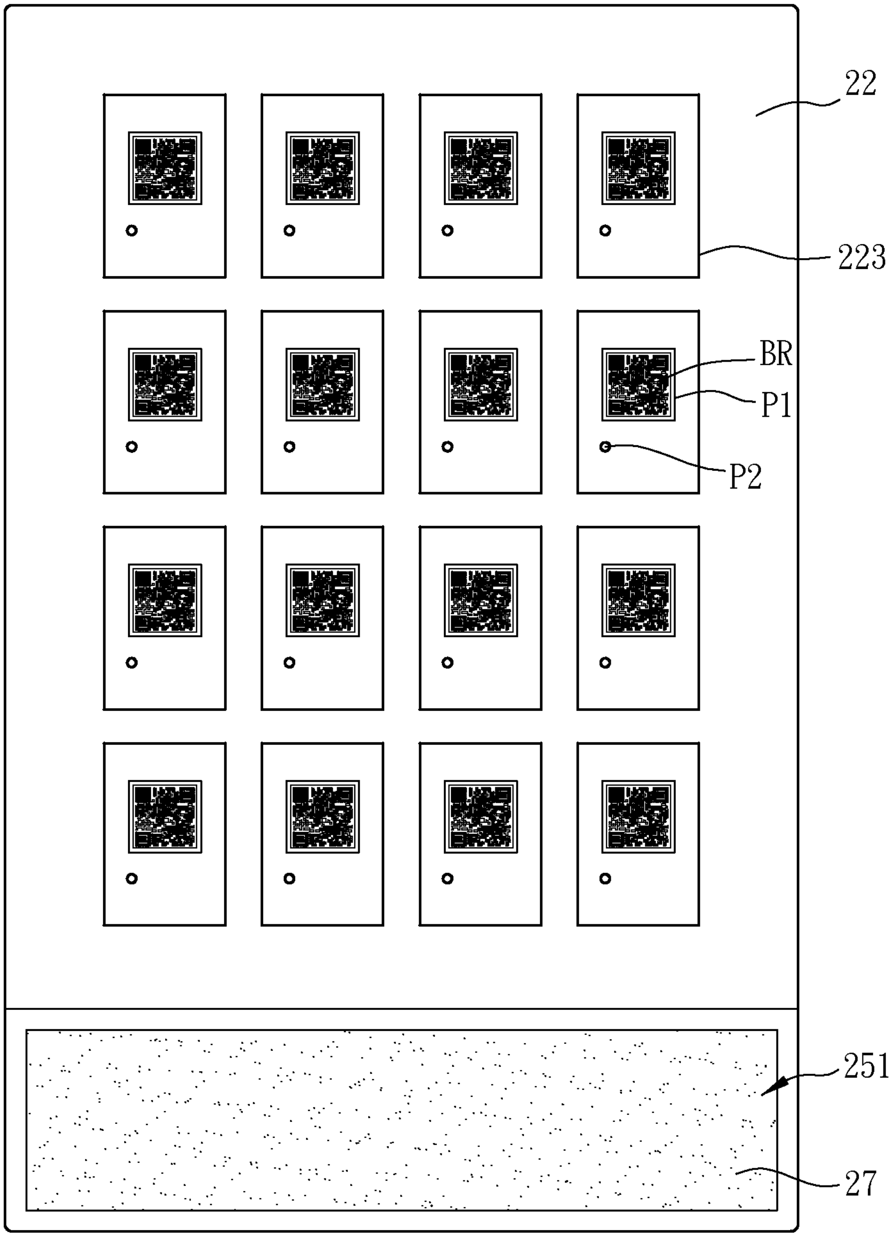
FIG. 5 is a top view showing the electronic medicine box of FIG. 4.

The upper cover portion 223 has an opening P1. For example, the opening P1 can be an empty hole or a solid transparent block. When the medicine container 21 is disposed in the housing unit 222 of the electronic medicine box 22, the barcode BR is exposed through the opening P1 and is readable. Of course, glass or transparent resin may also be disposed at the opening P1 so as to increase the tightness to the housing unit 222 without interfering the reading. FIG. 5 is a top view showing the electronic medicine box 22 of FIG. 4. The condition that the barcode BR (equivalent to the barcode 121 of the medicine container 1 of the preferred embodiment) is exposed through the opening P1 can be clearly understood according to FIG. 5.

Figure 6:
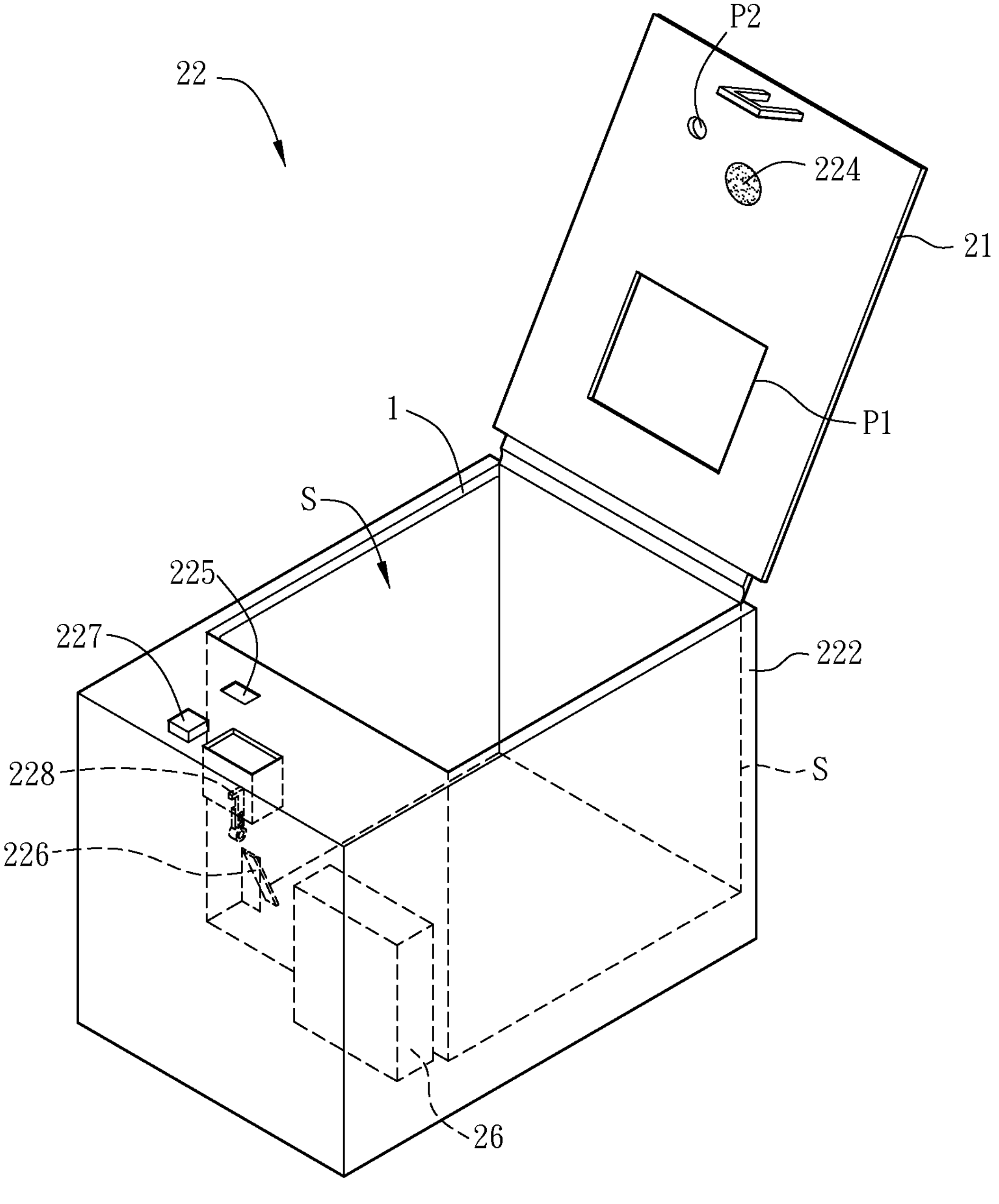
FIG. 6 is a schematic enlarged view showing the housing unit of FIG. 4.

FIG. 6 is a schematic enlarged view showing the housing unit 222 of FIG. 4, wherein the housing unit 222 is separated from the medicine container 21. Referring to FIG. 6, the housing unit 222 may further have a warning component 225. In this embodiment, the warning component 225 is a light-emitting diode (LED), and an opening P2 opposite to the warning component 225 is disposed on the upper cover portion 223. The warning component 225 can perform the medication warning (e.g., output a flash) according to the schedule, which is set by the electronic medicine box 22 after reading the medicine taking information of the barcode BR of the medicine container 21. Of course, the warning component 225 may also be a speaker for directly performing the audio warning. However, the invention does not intend to restrict the aspect of the warning component 225, and the warning component 225 may be even eliminated.

In addition, the housing unit 222 further has a container detection unit 226. The container detection unit 226 may be composed of two thin metal sheets and corresponding circuits. After the medicine container 21 is placed in, two originally hairpin-shaped thin metal sheets are pressed and contact with each other at the distal end, thereby outputting the signal as the basis of detecting whether the medicine container 21 is truly disposed in the containing space S. This may serve as a feedback mechanism for confirming whether the patient places back the medicine container 21 after taking the medicine container 21.

The housing unit 222 may also have a cover sensing unit 227 for sensing opening and closing of the upper cover portion 223. After the container detection unit 226 and the cover sensing unit 227 are combined, the electronic medicine box 22 can detect the patient's medication condition to, for example, ensure that the patient has accessed a medicine, placed the medicine container 21 back to the electronic medicine box 22, closed the upper cover portion 223, and then opened a next upper cover portion 223 where the next medicine to be taken is located, so that the user needs not to worry about the problem of the medication error.

Figure 7:
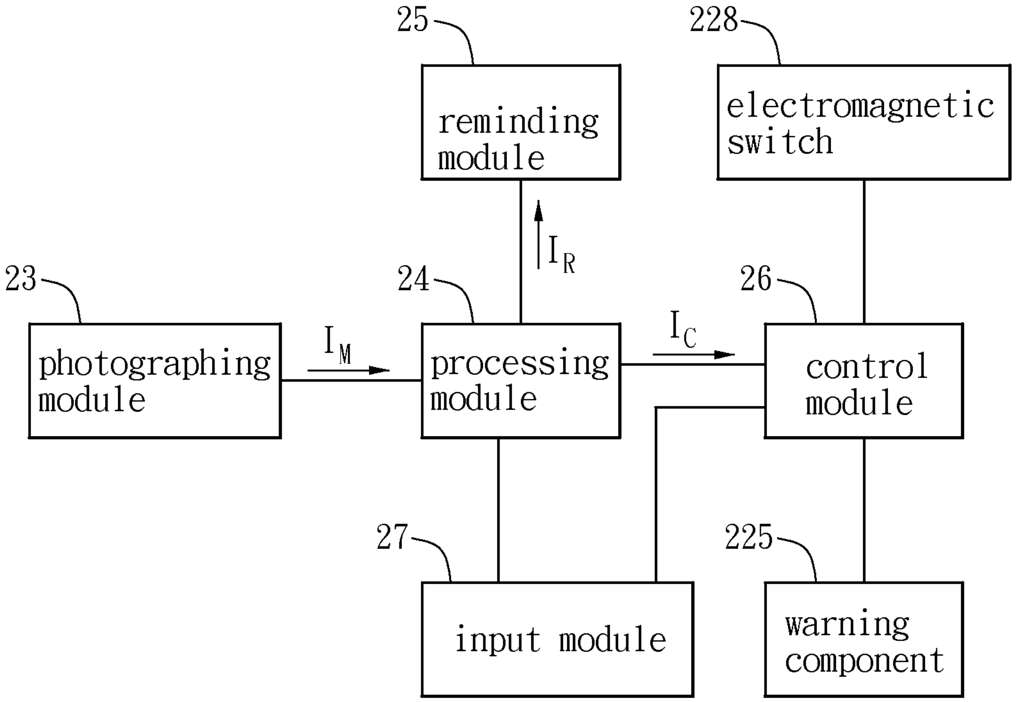
FIG. 7 is a schematic block diagram of the electronic medicine box as shown in FIG. 3.

FIG. 7 is a schematic block diagram of the electronic medicine box 22. Referring to FIGS. 3 to 7, the electronic medicine box 22 may further include a photographing module 23, a processing module 24, a reminding module 25 and a control module 26. When the medicine container 21 is disposed in the housing unit 222 of the electronic medicine box 22, the photographing module 23 may be utilized to capture the image and generate the image data $I_M$ containing the barcode BR because the barcode BR is exposed (see FIG. 5) and in a readable state. Then, the photographing module 23 outputs the image data $I_M$ to the processing module 24.

The processing module 24 receives and processes the image data $I_M$, and generates reminder data $I_R$ outputted to the reminding module 25. In this embodiment, the reminding module 25 may be a display panel 251. So, after receiving the reminder data $I_R$, the reminding module 25 can perform the reminding according to the content of the reminder data $I_R$ and the medicine taking information and the medicine information, for example, carried by the barcode BR at the specified time. Alternatively, the reminding module 25 can display the personal identification information recorded by the barcode BR of the medicine container 21 when the patient places the medicine containers 21 one by one, so as to ensure that the medicines taken from the medical institution are correct.

In addition, the processing module 24 also generates control data $I_C$ outputted to the control module 26. The control module 26 can control an electromagnetic switch 228 of each housing unit 222 at the specified time according to the content of the control data $I_C$, so that the upper cover portions 223 of the medicine containers 21 accommodating different medicines can be opened and closed, respectively, and the patient can be ensured to take the medicines precisely and sequentially. Meanwhile, the control module 26 can further control the warning component 225 on the housing unit 222, where the medicines to be taken are located, to output the flash, for example, and attract the patient's attention, thereby achieving the auxiliary medication effect.

In addition, the electronic medicine box 22 may further have an input module 27, which may be a touch panel disposed on the display panel 251. The input module 27 is coupled to the processing module 24 and the control module 26 and can perform the information input. Specifically speaking, if the medication of the user has been reminded by the sound outputted from the warning component 225 or the automatic opening of the electromagnetic switch 228, the reminding function can be disabled through the input module 27. Alternatively, if the user wants to manually input other medication times to remind the medication in advance, or to remind the user to take the specific medicine at the specific time, the input module 27 may also be operated to change the time, and another control data $I_C$ is transmitted to the control module 26 after the processing module 24 receives and processes the data.

It is to be specified that the "barcode reading" of the invention includes the processes of utilizing the photographing module 23 to capture the pattern of the barcode BR and utilizing the processing module 24 to receive, interpret and process the captured pattern.

Generally speaking, in the medicine container and the electronic medicine box using the same according to the invention, the barcode records the medicine taking information, the medicine information or the personal identification information, and the data are generated under the monitor or assistance of the experts without the involvement of the patient or the non-expert. So, the reminder data and the control data provided after the electronic medicine box decodes the barcode are correct. Therefore, when the electronic medicine box performs the digitized control on the basis of the data, the reminder and hint can be given precisely, thereby opening the correct medicine box container, providing the reference information of medicine taking, and effectively reducing the medicine taking error or the improper problem.

Furthermore, the invention can further function to record the patient's medication condition to remind the patient that whether the medicines have been discarded by combining the container detection unit with the cover sensing unit.

The invention further discloses a medication auxiliary device, which includes a plurality of medicine containers and an electronic medicine box. Each medicine container includes an accommodating portion and a cover portion. The accommodating portion has a medicine containing space. The cover portion is movably connected to the accommodating portion, and has a barcode. Also, the medicine container is detachably disposed in the electronic medicine box. The electronic medicine box includes a reminding module. When the medicine container is disposed in the electronic medicine box, the barcode is readable, and the reminding module performs the reminding according to the reminder data, generated after the barcode is read. However, the element structures and technological characteristics of the medicine container and the electronic medicine box can be found hereinabove, so detailed descriptions thereof will be omitted.

In summary, the medicine container and the medication auxiliary device thereof according to the invention have the following features. The medicine container has the barcode, which can carry the information, such as the medicine taking, the medicine information, the personal identification or the like. When being used in conjunction with the electronic medicine box, the information recorded on the barcode can be read through the electronic medicine box, so that the patient can precisely know the medicine taking information and the medicine information, for example, and the condition of medication error can be avoided by again checking the personal identification information. Most important of all, the medicine container is configured to load the medicines and record the barcode under the monitor of the expert (e.g., the expert in the hospital or pharmaceutical factory), and the commonly used electronic medicine box can assist the patient medication directly according to the recorded content of the barcode. More particularly, the opportunity of making the non-expert involve in the medicine dispensing can be reduced or even avoided, thereby effectively reducing the risk of error medication.

In addition, according to the property that the medicine container, which can be opened and closed and carry the associated information, the commonly used electronic medicine box can further have the reminding module and the warning component to actively and properly give the remind and check according to the medication schedule, so as to avoid the conditions caused by the medication time error, or forgetting to take the medicine, or the incorrect medication kind. Compared with the prior art, the invention provides a medicine container and its medication auxiliary device capable of improving the conventional problem, such as that the conventional medicine box cannot record the medicine taking information and the medicine information in detail, that the non-expert may involve in dispensing the medicines, that the reminding function setting processes are too complicated, and that the use is too inconvenient to cause the medication error indirectly.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A medication auxiliary device, comprising:

a plurality of medicine containers, each of which comprises:

an accommodating portion having a medicine containing space, and a cover portion, which is movably connected to the accommodating portion and has a barcode; and an electronic medicine box, wherein the medicine containers are detachably disposed in the electronic medicine box, and the electronic medicine box comprises:

a reminding module, wherein when the medicine containers are disposed in the electronic medicine box, the barcodes are readable, and the reminding module reminds according to reminder data, generated after the barcodes are read, wherein the electronic medicine box comprises a base having a plurality of housing units, and the medicine containers are detachably disposed in the housing units, respectively, and the electronic medicine box comprises a plurality of upper cover portions movably connected to the housing units, respectively, wherein the electronic medicine box further comprises a control module, which controls the upper cover portions to open and close according to control data generated after the barcodes are read.

2. The medication auxiliary device according to claim 1, wherein each of the housing units has a warning component.

3. The medication auxiliary device according to claim 1, wherein each of the upper cover portions has an opening, and when the medicine containers are disposed in the housing units of the electronic medicine box, the barcodes are exposed through the openings and become readable.

4. The medication auxiliary device according to claim 1, wherein each of the housing units has a cover sensing unit, which senses opening and closing of the upper cover portions.

5. The medication auxiliary device according to claim 1, wherein each of the cover portions has a metal member or a magnetic member, each of the upper cover portions has a magnetic piece, and the magnetic piece magnetically attracts the metal member or the magnetic member.

6. The medication auxiliary device according to claim 1, wherein each of the housing units has a container detection unit.

7. The medication auxiliary device according to claim 1, wherein the electronic medicine box further comprises a processing module, and the processing module receives and processes image data read from at least one of the barcodes.

8. The medication auxiliary device according to claim 7, wherein the electronic medicine box further comprises a photographing module, which outputs the image data to the processing module.

9. The medication auxiliary device according to claim 1, wherein each of the barcodes records medicine taking information, medicine information or personal identification information.

* * * * *